Sept. 5, 1961  E. P. AGHNIDES  2,998,996
VEHICLE WITH EXPANDABLE WHEELS
Filed July 26, 1957  3 Sheets-Sheet 1
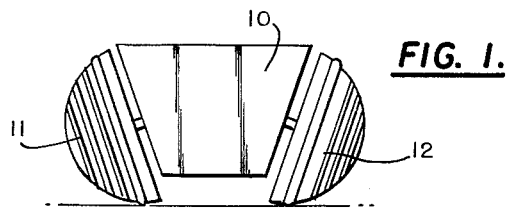
FIG. 1.
FIG. 2.
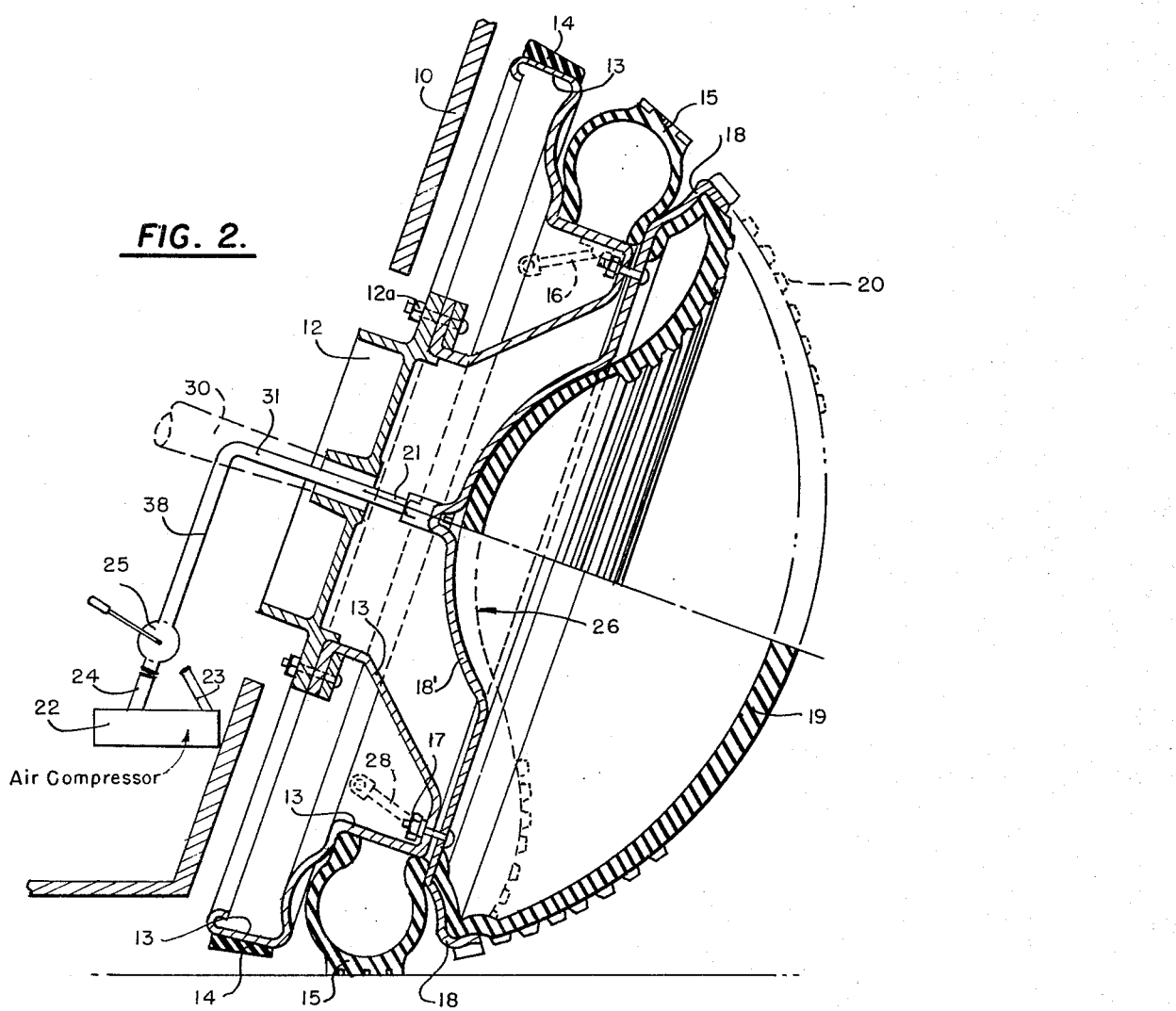
INVENTOR
Elie P. Aghnides
BY *Moore & Hall*
ATTORNEYS Sept. 5, 1961  E. P. AGHNIDES  2,998,996
VEHICLE WITH EXPANDABLE WHEELS
Filed July 26, 1957  3 Sheets-Sheet 2

INVENTOR
Elie P. Aghnides
BY Moore & Hall
ATTORNEYS

Sept. 5, 1961  E. P. AGHNIDES  2,998,996
VEHICLE WITH EXPANDABLE WHEELS
Filed July 26, 1957  3 Sheets-Sheet 3

INVENTOR
Elie P. Aghnides
BY *Moore & Hall*
ATTORNEYS

United States Patent Office 2,998,996
Patented Sept. 5, 1961

2,998,996
VEHICLE WITH EXPANDABLE WHEELS
Elie P. Aghnides, 46 W. 54th St., New York 19, N.Y.
Filed July 26, 1957, Ser. No. 674,429
5 Claims. (Cl. 301—41)

This invention relates to vehicles and more particularly to vehicles with large thick wheels on either side thereof.

As shown in my U.S. Patent No. 2,372,043, granted March 20, 1945, and as shown in my prior copending application Serial No. 362,700, now U.S. Patent No. 2,812,031, November 5, 1957, "Vehicle With Inclined Hemispheroidal Wheels," it is desirable to have large hemispheroidal wheels on opposite sides of a vehicle. However, sometimes the vehicle does not need these large wheels, as for example when it is traveling over hard terrain such as a paved road. Moreover, at times the large hemispheroidal wheels are a disadvantage since they substantially increase the width of the vehicle, which makes it difficult to pass the vehicle through a narrow space, as for example in forests.

The hemispheroidal wheels are of great advantage when the vehicle is operating on soft terrain, including mud, sand, etc., and when the vehicle is used amphibiously. The object of the present invention is to provide a vehicle in which the wheels can be expanded or contracted to provide either the hemispheroidal wheels which are so desirable in operating in soft terrain, or to contract the wheels to provide the desirable condition for operating on hard terrain.

Other objects and advantages of the invention will become apparent as this description proceeds.

In the preferred form of my invention, a vehicle, for example a military vehicle, has the side walls of its body slanting upwardly and outwardly. A tilted wheel is located on each side of the body. This wheel has an expansible and contractable member which is an inflatable element and which when inflated forms a large hemispheroid on the outer side of the wheel. This hemispheroid is used in addition to a pneumatic tire which is positioned to carry the load when the vehicle is operating on a paved road. When the aforesaid member is deflated the rolling surface of the wheel, for all practical purposes, consists merely of the simple pneumatic tire designed to operate on the hard terrain.

Suitable means are employed to inflate or deflate the expansible and contractable member to thus change the wheel from one of generally conventional form to the hemispheroidal form.

The two tilted wheels have their axes pointing normally outwardly and downwardly with the inner lower ends of the wheels closer together than the inner upper ends. Each said wheel has a ring-shaped rolling portion which is preferably the aforesaid pneumatic tire. The expansible and contractable member constitutes a supplementary rolling surface for use on soft terrain. When the expansible and contractable member is inflated it forms a hemispheroid, the latter begins immediately adjacent the periphery of the ring-shaped rolling portion (the pneumatic tire) and extends away from the outer part of said portion adjacent the surface of the ground for an extended distance.

In the drawings:

FIGURE 1 is a cross-sectional view of the type of vehicle to which the invention is applied.

FIGURE 2 is a cross-sectional view similar to that of FIGURE 1 but showing only one figure and including a showing of all the details.

Figure 3:
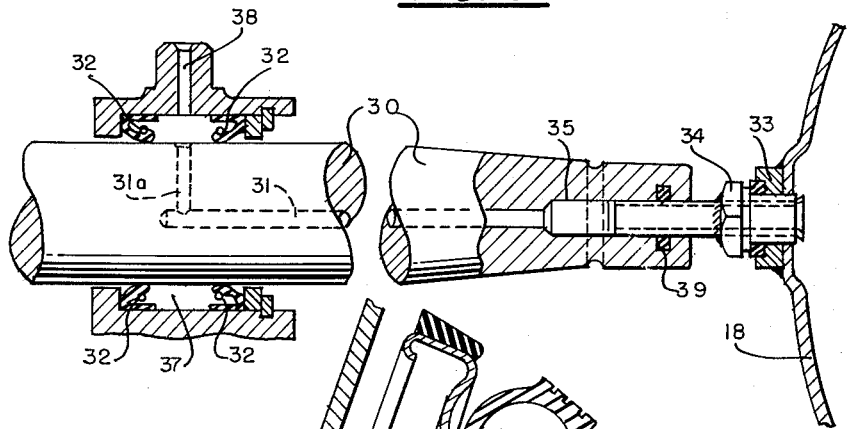
FIGURE 3 is a cross-sectional view of the details whereby the compressed air is transmitted through the shaft of the vehicle to the inflatable tire of FIGURE 2.

Referring to FIGURE 1, the vehicle body 10 has two hemispheroidal wheels 11 and 12 tilted outwardly and downwardly.

FIGURE 2 illustrates the vehicle with the present improvement included. The vehicle body 10 has an opening in its side wall through which the wheel extends. At the inner end of the wheel, it is bolted by bolts 12a to the wheel hub 12 of any suitable type. The supporting and driving means for hub 12 may be of the type disclosed in said prior Patent No. 2,812,031. The wheel has a frame 13 which connects it to the hub 12 and also acts as a support for the ring-shaped rolling portion 14 in the form of semi-hard rubber blades. Another ring-shaped rolling portion of the wheel is shown in its preferred form as a pneumatic tire 15. The pneumatic tire 15 is of conventional design, that is it is generally similar to those used on heavy trucks, and has an air inlet valve 16 therefor. By means of bolt 17, a metal supporting member 18 having a dished portion 18' is positioned inside the frame 13. An expansible and contractable member 19 preferably of flexible heavy rubber has treads 20 on its surface and is fastened at its periphery to the metal supporting member 18. The connection between the expansible and contractable member 19 and the metal supporting member 18 is airtight. A compressed air inlet tube 21 connects the space between members 18 and 19 to an air compressor 22. The air compressor has an inlet valve 23 through which the atmospheric air is sucked into the air compressor, and has an outlet valve 24 from which compressed air leaves the compressor. The pipe 21 has a switch valve which enables the pipe 21 to be connected either to the inlet valve 23 or the outlet 24. When connected to the inlet valve 23, a vacuum is created in the space between members 18 and 19 causing the rubber fabric 19 to be drawn against the metal supporting member 18, in which event it takes up position 26. When the valve 25 is switched to the compressed air outlet 24, the compressed air fed between members 18 and 19 causes the latter to expand and form a hemispheroid whereby it assumes position 27. An auxiliary air inlet valve 28 may also be used to feed compressed air into the space between members 18 and 19, should that become desirable at a time when the vehicle is standing still and the air compressor is not running. The valve 28 is designed to receive compressed air from any conventional air valve such as is used for inflating the tires of automobiles and trucks.

When it is desired to use the vehicle on hard terrain, for example paved roads, it is both unnecessary and undesirable for the expansible and contractable member 19 to be in inflated position. When it is inflated the width of the vehicle is greatly increased, making maneuverability in traffic much more difficult. Moreover, when the vehicle is used for military purposes it is undesirable for it to be wider than necessary, since increased width decreases its flexibility and maneuverability, as well as its ability to pass through narrow spaces such as the space between two trees. Moreover, an unnecessary increase in width renders the vehicle a better target. In those situations the operator will switch the valve 25 to the inlet valve 23, whereby the space between members 18 and 19 will be evacuated and the member 19 will be drawn tightly against the dished member 18 as shown by position 26.

When it is desired to operate the vehicle over soft terrain, such as mud, sand, etc., it is desirable to have a large hemispheroidal wheel. In that case, in event the vehicle sinks into the terrain the hemispheroid will provide increased traction and will also greatly reduce the likelihood that the vehicle will be tipped over on its side, all as explained in my aforesaid prior patents.

As shown in FIGURE 2, the only tire which touches the ground when the vehicle is operating on level terrain, is the pneumatic tire 15. The hard or semi-hard rubber blades 14 may be omitted entirely, but when they are used they merely serve to increase the traction when there has been substantial sinkage of the tire 15. When the expansible and contractable member 19 is deflated, it of course serves no substantial function, but when it is inflated it is normally above the ground and therefore does not touch the latter until there has been substantial sinkage by the pneumatic tire 15. The greater the sinkage the more the expansible and contractable member 19 will contact the ground and thus increase the traction area.

FIGURE 3 illustrates the details whereby air from the air compressor is fed to the expansible and contractable member 19. As shown in FIGURE 2, the shaft 30 is connected to hub 12 and has an internal hole 31 through which the compressed air may pass. This hole communicates by means of hole 31a (FIGURE 3) to the space 37 on the outside of the axle, which space 37 is sealed by means of four gaskets 32. Compressed air is fed from the air compressor to space 37 through pipe 38. The pipe socket 34 is fastened to the wheel body 33 and is also led into a perforation 35 of the axle 30 which is provided at its end with an O-ring 39.

Figure 4:
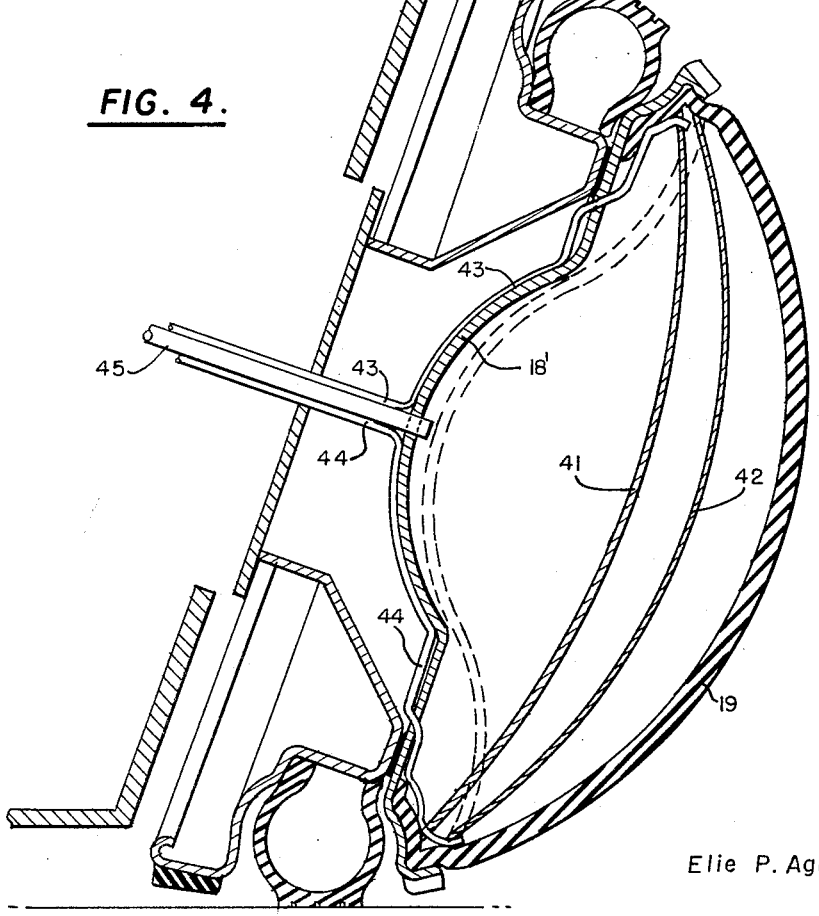
FIGURE 4 is a cross-sectional view of a modified form of the invention.

The modified form of the invention shown in FIGURE 4 is the same as that shown in FIGURE 2 except that additional diaphragms 41 and 42 are located in the expansible and contractable member 19 and with the further exception that separate pipes 43 and 44 feed the spaces to the chambers respectively formed by the diaphragms 41 and 42. That is, the volume defined by the metal supporting member 18 and the first diaphragm 41 is filled and emptied by the air (or vacuum as the case may be) supplied to pipe 45. The chamber formed between the two diaphragms 41 and 42 is filled with or emptied of compressed air through supply pipe 43, whereas the chamber formed between the second diaphragm 42 and the outer expansible and contractable member 19 is supplied with air through, or exhausted through, supply pipe 44. The advantage of a compartmentalized inflatable element is that a puncture either by reason of an enemy bullet, a nail, or otherwise, will generally effect only one compartment and will not normally render the entire tire inoperative.

Figure 5:
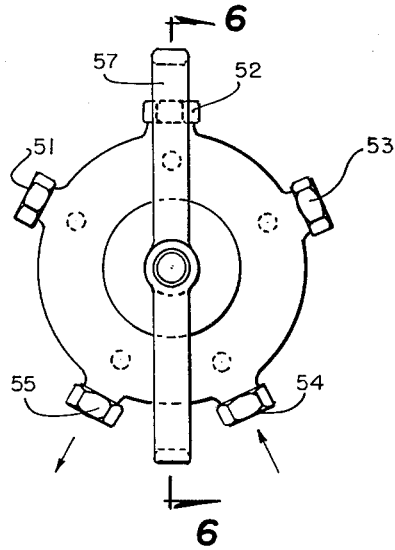
FIGURE 5 is a plan view of a valve suitable for use in connection with the form of FIGURE 4.
Figure 6:
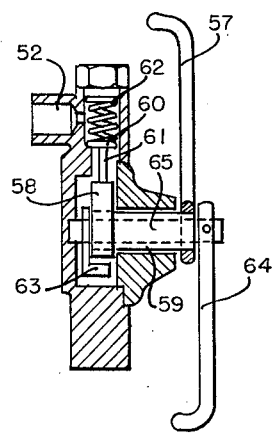
FIGURE 6 is a cross-sectional view, taken along line 6—6 of FIGURE 5.

The several compartments of the wheel may be inflated and/or deflated separately by means of the distributor valve arrangement shown in FIGURE 5. This valve has an inlet 54 which receives air under pressure from any suitable air compressor such as that shown at 22 of FIGURE 1. There are three outlets 51, 52 and 53 that respectively connect to pipes 43, 44 and 45 of FIGURE 4. The valve has an operating handle 57 which enables the operator to selectively connect the inlet 54 to any one of the three outlets 51, 52 or 53. Since this is a distributor valve, only one outlet is being fed with air under pressure at any one time, and the handle 57 enables the selection of which outlet receives the compressed air. The valve includes a cam 58, which cam is on a shaft 59 that is rotated by the handle 57. There are a plurality of individual valves, one for each outlet 51, 52 and 53. A typical individual valve 60 is mounted on a cam follower 61 which is forced inwardly by spring 62. When handle 57 is rotated to the correct angular position for any particular outlet, for example 52, the valve 60 for that outlet is moved upwardly by the cam 58 until compressed air received in the space 63 (from inlet 54) is fed outwardly through the outlet which in the example given is 52. The handle 64 operates through shaft 65 and controls the opening and closing of valves 54 and 55. The cam arrangement 63 for the inlet 54 and the outlet 55 is the same as for the outlets 51, 52 and 53. That is, the handle 64 can be movable to open the valve at entrance 54 in which event the valve at outlet 55 is closed. Alternatively, the handle 64 can be moved to open the valve at the outlet 55 in which event the valve at the inlet 54 is closed. The outlet 55 exhausts into the open air.

It follows from the foregoing that when handle 64 is moved to open the valve at 54 and thus close the valve at outlet 55, compressed air is fed into inlet 54 and will pass out of whichever of the three outlet valves 51, 52 or 53 has been opened by the handle 57. Thus by operating handle 57 the compressed air may be directed into any one of the three chambers 18—41, 41—42 and 42—27 of FIGURE 4. The handle 57 may be so operated to fill the three chambers in the order that they were just mentioned. If it is desired to exhaust one or more of three said chambers, the handle 64 is moved to open the valve at outlet 55 while closing the valve at inlet 54. By then moving handle 57 so that the outlet 55 communicates with one of the openings 51, 52 or 53, the compressed air in the chamber which communicates with that opening will then be exhausted through the opening 55. As a result, the handle 57 may be moved to exhaust any one of the three chambers.

Summarizing the action of the foregoing, the operation of handle 64 determines whether or not air is to be fed into a chamber or to be exhausted therefrom, whereas handle 57 determines which chamber is to be supplied with air or exhausted.

Figure 7:
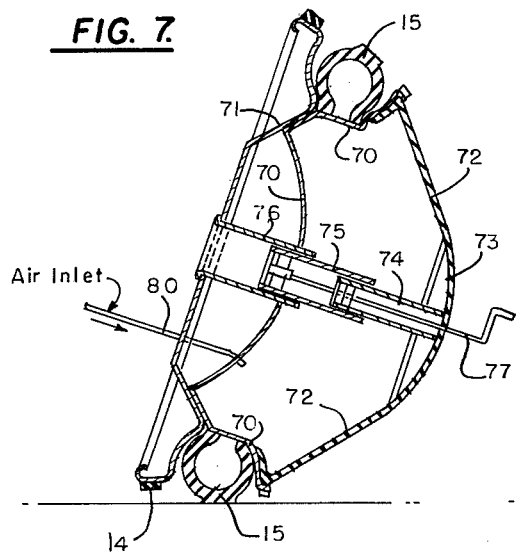
FIGURE 7 is a cross-sectional view of yet another modified form of the invention.
Figure 8:
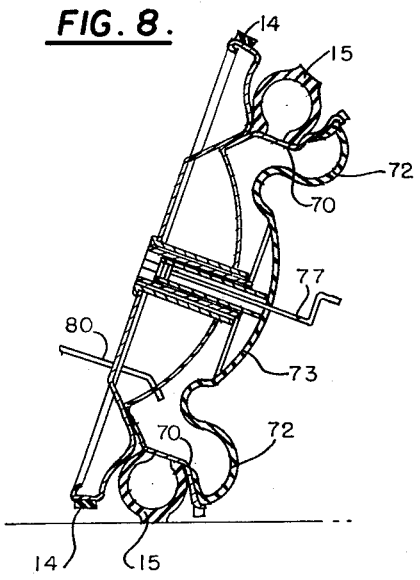
FIGURE 8 is a cross-sectional view of the form shown in FIGURE 7 but in the collapsed position instead of the expanded position of FIGURE 7.

The modified form of FIGURE 7 does not require any compressed air, but air under pressure may be added if desired. This form of the invention has main ring-shaped rolling surfaces in the form of tires 14 and 15, the plain tire 14 acting when the main and pneumatic tire 15 is punctured. The mounting of these elements is similar to FIGURE 2. A framework 70, 71 supports the tires 14 and 15. Mounted on the outer flange of framework 70 is a supplementary rolling surface in the form of a flexible rubber element 72 which connects to an outer metal cap 73. The cap 73 is held in extended position by telescoping members 74, 75, 76. The telescoping members 74, 75, 76 are controlled by a key 77. When this key is turned to the right by a small fraction of one turn, the telescoping members 74, 75, 76 are locked together, by any suitable locking means of which many are shown in the prior art, in which event the telescoping members 74, 75, 76 form a single rigid support for the cap 73. The telescoping members are sufficiently strong that if the weight of the vehicle should be placed thereon it could be sustained without seriously deforming the cap 73. On the other hand, the key 77 may be operated by rotating it counter clockwise a fraction of a revolution, to unlock the telescoping members, in which event the cap 73 may be moved inwardly to the position shown in FIGURE 8, thereby greatly reducing the overall width of the wheel. The key 77 may be readily removed if desired so that it will not interfere with the operation of the vehicle after the cap 73 has been set to its inner, or outer position as desired, and locked in that desired position. While unnecessary to this form of the invention, an air inlet 80 may feed compressed air into the expanded flexible rubber element 72 after it has been moved to its expanded position shown in FIGURE 7. The flexible rubber element 72 between the support 70 and the cap 73 insures that the tire is air tight and water-tight, whereby the load carrying capacity of the expanded tire is increased and whereby further it has amphibious properties.

In all three forms of the invention the wheel is relatively thin as compared to its diameter when the same is in its contracted position. When in its expanded position, the thickness of the wheel is more than doubled and under certain circumstances this has important advantages. For example, the vehicle has then the desired buoyancy in water and is therefore amphibious. Moreover it will operate better over sand, snow and other soft terrain, and in addition it will not tip over readily inasmuch as the large bulge on the side of the wheel will sustain the weight of the vehicle and tend to carry the load in event the vehicle begins to tip over sideways.

Other advantages of the inflated wheel are obvious to those skilled in the art.

I claim to have invented:

1. A vehicle having a vehicle frame and load-carrying rolling ground-contacting wheels disposed respectively on opposite sides of the vehicle, said frame including means maintaining the wheels with their axes pointing normally outwardly and downwardly with the inner lower ends of the wheels closer together than the inner upper ends, said wheels each comprising a ring-shaped rolling portion and also including on the outer side of said rolling portion an expansible and contractable member which when expanded constitutes a supplementary rolling surface beginning immediately adjacent the periphery of said ring-shaped portion and extending away from the outer part of said portion adjacent the surface of the ground for an extended distance, the diameter of said member when expanded decreasing as the distance from said outer side increases.

2. A vehicle as defined in claim 1 in which said member is an inflatable elastic element which when inflated with compressed air constitutes a pneumatic tire, and a compressed air inlet for the member.

3. A vehicle as defined in claim 2 in which said rolling portion has an outer side wall with a depression therein, and means for applying suction to the member to contract it and suck it at least partly into said depression.

4. A vehicle as defined in claim 1 in which said member includes a tapered metal element movable along the axis of the wheel and which when moved outward expands the member and thereby provides said supplementary rolling surface for the wheel.

5. A vehicle as defined in claim 1 in which said member is hemispheroidal when expanded.

References Cited in the file of this patent

UNITED STATES PATENTS

| | | |
|---|---|---|
| 1,572,531 | Henkel | Feb. 9, 1926 |
| 1,973,007 | Martin | Sept. 11, 1934 |
| 2,330,958 | Danforth | Oct. 5, 1943 |
| 2,395,383 | White | Feb. 19, 1946 |
| 2,751,959 | Bloomquist | June 26, 1956 |

OTHER REFERENCES

"Two Chamber Safety Tire," by Goodyear, on page 47 of "Tires–TBA Merchandising" (June 1956.) (Copy in 152/340.)